Aug. 31, 1948. C. A. BALTON 2,448,291
ENGINE STARTER CLUTCH
Original Filed March 23, 1943
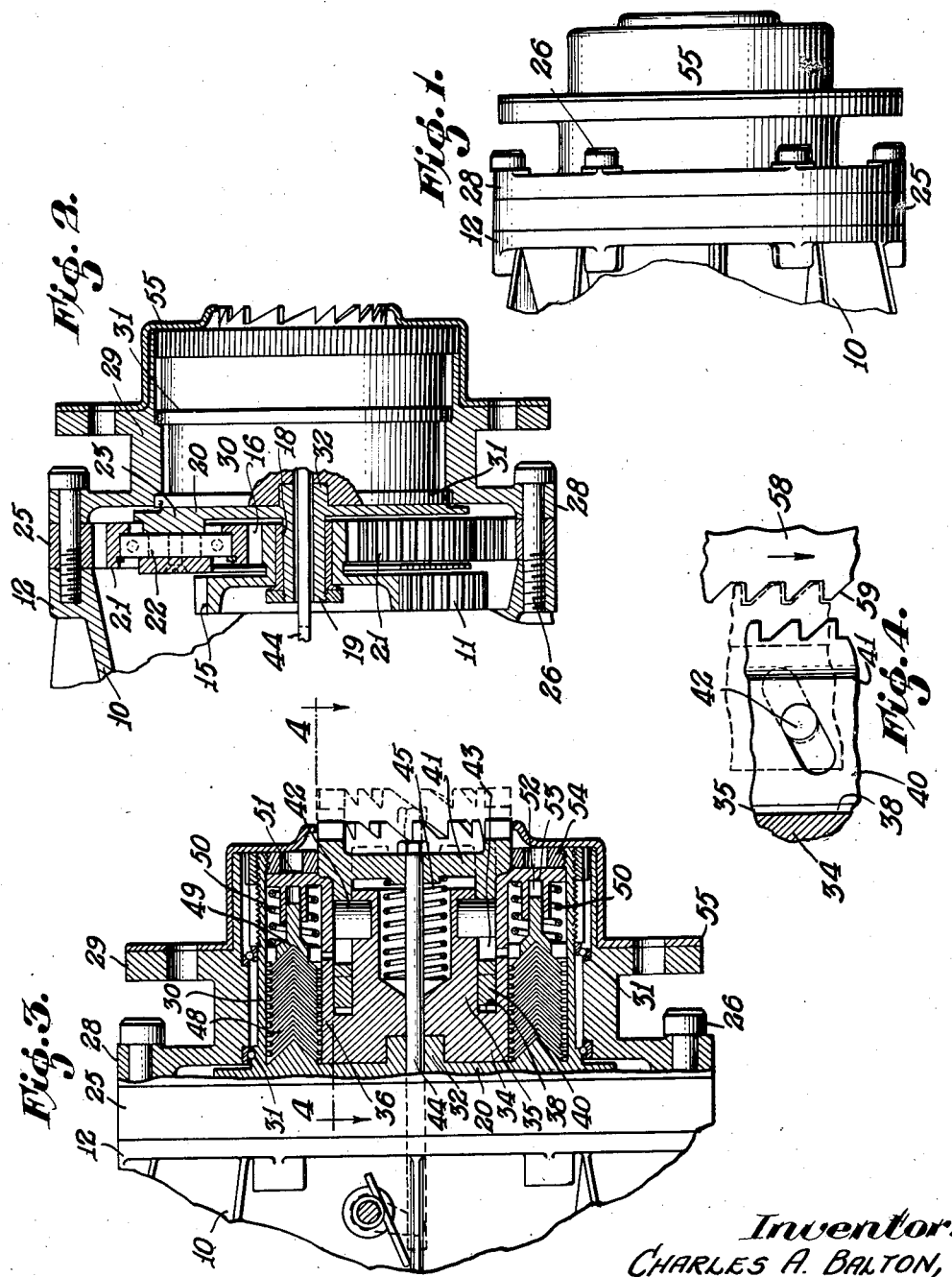
Inventor:
CHARLES A. BALTON,
by Popp and Popp
Attorneys.

Patented Aug. 31, 1948

2,448,291

UNITED STATES PATENT OFFICE 2,448,291

ENGINE STARTER CLUTCH

Charles A. Balton, Buffalo, N. Y.

Original application March 23, 1943, Serial No. 480,173. Divided and this application October 30, 1944, Serial No. 561,017

13 Claims. (Cl. 123—179)

This invention relates to a clutch and more particularly to a jaw clutch adapted to be used in conjunction with an airplane starting motor as shown in my copending application Serial No. 480,173, filed March 23, 1943, for Internal combustion engine of which this is a divisional application.

One of the objects of the invention is to provide a reliable, lightweight, high power and high speed clutch which can be used to couple the starting motor for an airplane engine with the airplane engine itself.

Another object is to provide such a clutch which is very compact and also is self-contained.

Another object is to provide such a clutch which will stand up under conditions of severe and constant use.

Another object is to provide such a clutch which is positive when closed and completely disengaged when open and which, when closed, will transmit heavy torque forces.

Another object is to provide a jaw clutch including a yielding drive to avoid breakage in the event an overload is encountered.

Other objects and advantages will appear from the following description and drawings in which:

Fig. 1 is a fragmentary side elevation of one end of an internal combustion engine designed for use as the starting motor of a much larger airplane engine and showing the clutch embodying the present invention in elevation.

Fig. 2 is a view similar to Fig. 1 showing parts of the clutch and end head of the internal combustion engine broken away.

Fig. 3 is an enlarged vertical central section through the clutch shown in Figs. 1 and 2 and showing parts in elevation.

Fig. 4 is a fragmentary section, taken on line 4—4, Fig. 3.

The clutch or coupling is shown as mounted on the starting motor for a much larger airplane motor, the construction of these motors being illustrated in detail in my said copending application Serial No. 480,173, filed March 23, 1943, for Internal combustion engine of which this application is a division. The starting motor is shown as having an end head 10 forming the casing for the gearing driven by the starting motor, this gearing being represented by the driven gear 11. This end head or gear case 10 is shown as being open at its extremity, this opening being surrounded by a rim 12 to which the clutch or coupling forming the subject of the present invention relates.

The clutch or coupling forming the subject of this invention is shown as driven through planetary gearing from the pinion 11 and for this purpose the pinion 11 is shown as meshing with a gear 15, the hub of this gear 15 being formed to provide a pinion 16 and rotatably mounted on a bearing bushing 18 mounted on the hub 19 of a spider 20. This spider carries a plurality of pinions 21, these pinions being preferably three in number and each mounted on a roller bearing 22 carried by a pin 23 formed integrally with the spider 20. Each of the pinions 21 meshes with a stationary ring gear 25 which is shown as secured, by screws 26, to the rim 12 of the end head 10. These screws 26 also serve to hold the rim 28 of a cylindrical casing 29 against the outer face of the ring gear 25. As best shown in Figs. 2 and 3, the spider 20 is formed to provide a cylindrical extension 30 which is journaled in the stationary cylindrical casing 29 by means of roller bearings 31.

As best shown in Fig. 3, this spider is also formed to provide a cylindrical centering stem 32 projecting coaxially into the chamber formed by the cylindrical extension 30 and centering a cylindrical support 34. This cylindrical support is formed to provide a coaxial hub 35 of reduced diameter and is provided with an axially extending flange or rim 36 which forms, with the hub 35, a cylindrical groove 38. In this groove is arranged the sleeve 40 of a jaw clutch 41, this jaw clutch having face teeth or jaws 42 at its end. The jaw clutch 41 and its cylindrical support 34 are compelled to rotate in unison through four pins 42 in the cylindrical support 34 and extending into slots 43 in the sides of the sleeve 40 of the jaw clutch. As will be noted from Fig. 4, each of the slots 43 is disposed at an angle to the axis of the clutch so that as the clutch is moved axially in and out it is turned to a degree determined by the angularity of the slots 43.

This axial movement of the clutch 41 can be effected manually, the jaw clutch being normally held in its extended or dotted line position as shown in Fig. 3 by a helical compression spring 45 which is arranged in a recess provided in the end of the cylindrical support 34 for the clutch and urges the clutch 41 outwardly. The jaw clutch 41 is retracted inwardly by means of a manually operated rod 44 which extends axially through the cylindrical support 34 for the clutch jaw and the spider 20. As best shown in Figs. 2 and 3, the free end of this rod 44 is arranged in the chamber formed by the end head or gear case 10 of the engine and can be moved to the left by any suitable form of manual control (not shown), an example of which is shown in my said parent application.

The drive between the spider 20 and the cylindrical support 34 for the jaw clutch 41 includes a friction clutch which provides a yielding drive between these two members so as to avoid breakage in the event of an overload being placed upon the starting motor. For this purpose a series of clutch plates 48 are provided in the space between the cylindrical extension 30 of the spider 20 and the cylindrical support 34 for the jaw clutch 41. Alternate plates of this group are keyed to the cylindrical extension 30 of the spider 20 so as to rotate therewith and the intermediate plates 48 are similarly keyed to the cylindrical support 34 for the jaw clutch 41. The drive is therefore determined by the frictional engagement of the two sets of intercalated clutch plates, this friction being determined by a ring 49 which bears against the endmost friction clutch plate 48 and is pressed thereagainst by a plurality of helical compression springs 50 interposed between the ring 49 and an annular collar 51 which is L-shaped in cross section.

One flange of this collar 51 fits in the bore of the cylindrical extension 30 of the spider 20 and its other flange fits around the cylindrical sleeve 40 of the jaw clutch and serves to hold the pins 42 in place. To prevent misalinement of the helical compression springs 50, the ring 49 within each of the springs 50 is preferably formed to provide a stem 52, each of which is slidingly received in a socket 53 formed on the radially extending flange of the annular ring 51. The position of the ring 51 and hence the force exerted by the compression springs 50 is determined by an end ring 54 which is threaded and screwed into the internally threaded end of the cylindrical extension 30 of the spider 20, the axial position of the ring 51 thereby being determined by the adjustment of the threaded ring 54. The parts of the clutch are preferably protected against the entrance of dust and dirt by a sheet metal collar 55 which can be secured to the stationary cylindrical casing in any suitable manner.

The jaws 42 of the jaw clutch 41 are moved axially into engagement with a driven member 58 having mating jaws 59, such driven members being connected, for example, to the drive shaft of the main motor (not shown) of the airplane, the clutch forming the subject of the invention being adapted to establish a driving connection between the starting motor and the main motor of the airplane.

When the operating rod 44 is released, a driving connection is established between the intermeshing teeth 42 and 59 of the driving clutch member 41 and the driven clutch member 58, this being established and maintained by the helical spring 45 which urges the driving clutch 41 to the right, as viewed in Figs. 1 and 3, and also by the angularity of the slots 43.

When the clutch is so engaged a drive is established from the driven pinion 11 of the starting motor 10 to the gears 15 and 16 mounted on the bushing 18 and thence through the three planetary gears 21 to the spider 20, the other sides of the planetary gears 21 meshing with the ring gear 25, this ring gear being secured to the motor casing 10 by the screws 26. The rotation of the spider 20 effects the rotation of its integral cylindrical extension 30 in the bore of which is keyed the alternate series of friction clutch plates 48, the other series of these plates 48 being keyed to the periphery of the cylindrical support 34 which is centered by the stem 32 projecting coaxially from the spider 20. This cylindrical support 34 is therefore rotated as long as frictional contact is maintained by the two series of the intercalated plates 48. The rotation of the cylindrical support 35, through the pins 42, effects a rotation of the driving clutch member 41 and since the jaws 42 of this driving clutch member 41 are in engagement with the jaws 59 of the driven clutch member 58 it will be seen that a drive is effected, through the clutch, to the driven clutch member 58.

It will further be seen that by the inclination of the slots 43 provided for the pins 42 in the driving clutch member 41, the pressure of the pins 42 tends to maintain engagement of the jaws 42 and 59. Thus, as illustrated by dotted lines in Fig. 4, the pressure of the pin 42 in the direction of the arrow against the corresponding side of the angular slot 43 tends to urge the driving clutch member 41 axially to the right or further into engagement with the jaws 59 of the driven clutch member 58. Therefore the angularity of the slots 43 as shown adds to the force of the spring 45 in maintaining engagement of the clutch jaws 42 and 59 as long as a driving torque exists, that is, as long as force is being transmitted through the clutch 41 to the driven member.

It will be seen that the maximum torque which can be transmitted by the clutch is determined by the frictional engagement of the intercalated clutch plates 48. This friction can be adjusted by turning the threaded ring 54, the adjustment of this threaded ring determining the axial position of the ring 51. Since the corresponding ends of the springs 50 are seated on this ring 51, it will be seen that this axial adjustment of the position of this ring 54 determines the pressure which these springs 50 exert against the ring 49, this ring 49 in turn bearing against the endmost of the intercalated plates 48 and its bearing pressure thereby determining the friction between the two alternate series of intercalated plates 48.

When it is desired to release the clutch, the operator pulls upon the rod 44. This draws the driving clutch member 41 from the dotted to the full line position shown in Fig. 3, thereby disengaging its jaws 42 from the jaws 59 of the driven clutch member 58. This movement is effected against the resistance of the spring 45. However, the opening of the clutch is usually initiated by the fact that the main engine (not shown) has been started. When this main motor starts, the driven clutch member rotates at a higher rate of speed than the driving jaws 42 of the clutch 41 and in the same direction as before, that is, in the direction of the arrow associated with Fig. 4. When this occurs the slanting advance faces of the jaws 59 engage the slanting trailing faces of the jaws 42, the wedging action between these sets of jaws tending to move the clutch 41 to the left, as viewed in Figs. 3 and 4, or to a disengaged position. This automatic disengagement of the jaws 42 and 59 is also facilitated by the angularity of the slots 43. Thus, on reverse torque, that is, from the driven member 58 to the clutch 41 in the direction of the arrow associated with Fig. 4, the upper wall of each slot 43, as viewed in Fig. 4, is caused to bear against the corresponding pin 42. The wedging action produced tends to move the clutch 41 to the left, as viewed in Figs. 3 and 4, and to disengage the jaws 42 and 59. The clutch is therefore self-disengaging when used between a starting motor and a main motor, as proposed. However, to avoid clicking of the jaws 42 and 59, after the main motor has been started the rod 44 is drawn against the resistance of the spring 45 to effect a complete disengagement of these jaws 42 and 59.

From the foregoing it will be seen that the present invention provides a very simple and compact clutch mechanism for transmitting heavy loads and in which adequate means are provided to permit slippage when overloads are encountered and it will further be seen that the engagement and disengagement of the jaws of the clutch are effected smoothly and positively. The clutch is also self disengaging when used as the clutch between an internal combustion starting engine and the main engine of, for example, an airplane.

I claim as my invention:

1. A clutch for releasably coupling a driving and a driven part, comprising a cylindrical body arranged coaxially of said driving part and rotating therewith, a second cylindrical body fitting the cylindrical surface of said first cylindrical body and having jaws adapted to engage with jaws of said dr'ven part, means for moving said second cylindrical body axially relative to said first cylindrical body to engage and disengage said jaws, and means compelling said cylindrical bodies to rotate in unison, comprising a projection secured to one of said cylindrical bodies and extending radially therefrom into a helical slot provided in the other cylindrical body.

2. A clutch for releasably coupling a driving and a driven part, comprising a cylindrical body arranged coaxially of said driving part and rotating therewith, a second cylindrical body fitting the cylindrical surface of said first cylindrical body and having jaws adapted to engage with jaws of said driven part, means for moving said second cylindrical body axially relative to said first cylindrical body to engage and disengage said jaws, and means compelling said cylindrical bodies to rotate in unison, comprising a projection secured to one of said cylindrical bodies and extending radially therefrom into a helical slot provided in the other cylindrical body, said slot being arranged at an angle to the axis of said cylindrical bodies to effect a rotative movement of said second cylindrical body upon moving it axially relative to said first cylindrical body.

3. A clutch for releasably coupling a driving and a driven part, comprising a cylindrical body arranged coaxially of said driving part and rotating therewith, a second cylindrical body fitting the cylindrical surface of said first cylindrical body and having axially extending face jaws adapted to engage with axially extending face jaws of said driven part, means for moving said second cylindrical body axially relative to said first cylindrical body to engage and disengage said jaws, and means compelling said cylindrical bodies to rotate in unison, comprising a projection secured to one of said cylindrical bodies and extending radially therefrom into a helical slot provided in the other cylindrical body.

4. A clutch for releasably coupling a driving part and a driven part, comprising a cylindrical body arranged coaxially of said driving part and rotating therewith, a second cylindrical body fitting the cylindrical surface of said first cylindrical body and having face jaws extending axially therefrom and having abrupt driving faces and inclined trailing faces and adapted to engage counterpart face jaws provided on said driven part, means for moving said second cylindrical body axially relative to said first cylindrical body to engage and disengage said jaws, and means compelling said cylindrical bodies to rotate in unison, comprising a projection secured to one of said cylindrical bodies and extending radially therefrom into a helical slot provided in the other cylindrical body, the line of slope of said slot being generally perpendicular to the trailing faces of the adjacent jaws of said second cylindrical body.

5. A clutch for releasably coupling a driving and a driven part, comprising a cylindrical body arranged coaxially of said driving part and rotating therewith, a second cylindrical body in the form of a sleeve fitting the exterior cylindrical surface of said first cylindrical body and having face jaws extending axially therefrom and adapted to engage counterpart face jaws of said driven part, means for moving said second cylindrical body axially relative to said first cylindrical body to engage and disengage said jaws, and means compelling said cylindrical bodies to rotate in unison, comprising a pin secured to said first cylindrical body and extending radially outward therefrom into a helical slot provided in the second cylindrical body, said slot being so arranged helically to effect a rotative movement of said second cylindrical body upon moving it axially relative to said first cylindrical body.

6. A clutch for releasably coupling a driving and a driven part, comprising a cylindrical body arranged coaxially of said driving part and rotating therewith, a second cylindrical body fitting the cylindrical surface of said first cylindrical body and having jaws adapted to engage with jaws of said driven part, a spring interposed between said cylindrical bodies and urging said second cylindrical body axially in one direction, means for moving said second cylindrical body axially in the opposite direction, said jaws being engaged and disengaged by said axial movements of said second cylindrical body, and means adapted to operatively connect said cylindrical bodies, comprising a projection secured to one of said cylindrical bodies and extending radially therefrom into a slot provided in the other cylindrical body.

7. A clutch for releasably coupling a driving and a driven part, comprising a cylindrical body arranged coaxially of said driving part and rotating therewith, a second cylindrical body fitting the cylindrical surface of said first cylindrical body and having jaws adapted to engage with jaws of said driven part, a spring interposed between said cylindrical bodies and urging them axially apart to engage said jaws, means for moving said second cylindrical body in the opposite direction to disengage said jaws, and means compelling said cylindrical bodies to rotate in unison, comprising a projection secured to one of said cylindrical bodies and extending radially therefrom into a helical slot provided in the other cylindrical body.

8. A clutch for releasably coupling a driving and a driven part, comprising a cylindrical body arranged coaxially of said driving part and rotating therewith, a second cylindrical body fitting the cylindrical surface of said first cylindrical body and having jaws adapted to engage with jaws of said driven part, a spring interposed between said cylindrical bodies and urging them axially apart to engage said jaws, means for moving said second cylindrical body in the opposite direction to disengage said jaws, and means compelling said cylindrical bodies to rotate in unison, comprising a projection secured to one of said cylindrical bodies and extending radially therefrom into a helical slot provided in the other cylindrical body, said slot being arranged at an angle to the axis of said cylindrical bodies to effect a rotative movement of said second cylindrical body upon moving it axially relative to said first cylindrical body.

9. A clutch for releasably coupling a driving and a driven part, comprising a cylindrical body arranged coaxially of said driving part and rotating therewith, a second cylindrical body fitting the cylindrical surface of said first cylindrical body and having jaws adapted to engage with jaws of said driven part, a spring interposed between said cylindrical bodies and urging said second cylindrical body axially in one direction, a rod secured to the axis of said second cylindrical body and extending through a bore provided in said first cylindrical body for moving said second cylindrical body axially in the opposite direction, said jaws being engaged and disengaged by said axial movements of said second cylindrical body, and means adapted to operatively connect said cylindrical bodies, comprising a projection secured to one of said cylindrical bodies and extending radially therefrom into a slot provided in the other cylindrical body.

10. A clutch for releasably coupling a driving and a driven part, comprising a stationary ring gear, a pinion driven by said driving part, a rotatable spider carrying pinions meshing with said stationary ring gear and pinion, a coaxial cylindrical member carried by said spider, a cylindrical clutch member slidingly mounted on said first cylindrical member and having face jaws at one end adapted to engage similar jaws on said driven part, a pin connecting said cylindrical members and arranged in a slot provided in one to compel said cylindrical members to turn in unison but permitting relative axial movement therebetween, and means for manually moving said cylindrical clutch members axially to engage and disengage said face jaws.

11. A clutch for releasably coupling a driving and a driven part, comprising a stationary ring gear, a pinion driven by said driving part, a rotatable spider carrying pinions meshing with said stationary ring gear and pinion, a coaxial cylindrical member carried by said spider, a cylindrical clutch member slidingly mounted on said first cylindrical member and having face jaws at one end adapted to engage similar jaws on said driven part, a pin connecting said cylindrical members and arranged in a slot provided in one to compel said cylindrical members to turn in unison but permitting relative axial movement therebetween, said slot being arranged at an angle to the axis of said cylindrical members to effect a rotative movement of said cylindrical clutch member upon moving it axially relative to said first cylindrical member, and means for moving said cylindrical clutch member axially to engage and disengage said face jaws.

12. A clutch for releasably coupling a driving and a driven part, comprising a stationary ring gear, a pinion driven by said driving part, a rotatable spider carrying pinions meshing with said stationary ring gear and pinion, a coaxial cylindrical member carried by said spider, a cylindrical clutch member slidingly mounted on said first cylindrical member and having face jaws at one end adapted to engage similar jaws on said driven part, a pin connecting said cylindrical members and arranged in a slot provided in one to compel said cylindrical members to turn in unison but permitting relative axial movement therebetween, means for moving said cylindrical clutch member axially to engage and disengage said face jaws, and a friction clutch interposed between said cylindrical members.

13. A clutch for releasably coupling a driving and a driven part, comprising a stationary ring gear, a pinion driven by said driving part, a rotatable spider carrying pinions meshing with said stationary ring gear and pinion, a coaxial cylindrical member carried by said spider, a cylindrical clutch member slidingly mounted on said first cylindrical member and having face jaws at one end adapted to engage similar jaws on said driven part, a pin connecting said cylindrical members and arranged in a slot provided in one to compel said cylindrical members to turn in unison but permitting relative axial movement therebetween, and means for manually moving said cylindrical clutch member axially to engage and disengage said face jaws, comprising a coaxial rod connected to said cylindrical clutch member and extending through bores provided in said first cylindrical member and spider, and means adjacent said spider for manually moving said rod axially.

CHARLES A. BALTON.

REFERENCES CITED

The following references are of record in the file of this patent:

UNITED STATES PATENTS

| Number | Name | Date |
|---|---|---|
| 1,876,642 | Doub | Sept. 13, 1932 |
| 1,955,110 | Brockway | Apr. 17, 1934 |
| 2,017,464 | Lansing | Oct. 15, 1935 |
| 2,075,119 | Lansing | Mar. 30, 1937 |
| 2,338,403 | Callsen | Jan. 4, 1944 |